(12) United States Patent
Erickson

(10) Patent No.: US 7,005,779 B2
(45) Date of Patent: Feb. 28, 2006

(54) POWER GENERATOR EMPLOYING PIEZOELECTRIC MATERIALS

(75) Inventor: David J. Erickson, Liverpool, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/863,018

(22) Filed: Jun. 8, 2004

(65) Prior Publication Data
US 2005/0269907 A1    Dec. 8, 2005

(51) Int. Cl.
H01L 41/08 (2006.01)
(52) U.S. Cl. .................................... 310/328
(58) Field of Classification Search ............... 310/328, 310/339, 323.16, 364; H01L 41/08
See application file for complete search history.

(56) References Cited

U.S. PATENT DOCUMENTS 4,399,386 A * 8/1983 Osaka et al. ............... 310/328
4,782,262 A * 11/1988 Kiyo-Oka .................. 310/328
5,068,565 A * 11/1991 Huang ....................... 310/328

* cited by examiner

Primary Examiner—Darren Schuberg
Assistant Examiner—Karen Addison
(74) Attorney, Agent, or Firm—Plevy, Howard & Darcy PC

(57) ABSTRACT

An efficient generator of electrical power employs groups of piezoelectric devices disposed in a radial manner about a centrally located cam. The cam, when rotated by a prime mover as a conventional source of mechanical energy, applies a periodic varying force to each piezoelectric device in a suitable sequence. The devices operate to respond to the rotation of the cam by having a cam follower coupled to each device via a spring, whereby a periodically varying force is applied to each piezoelectric device according to the cam surface and based on the rotation of the cam. Each device produces an output voltage according to the force applied to the device via the cam and the coupling between the device and the cam surface. Each device includes a stack of low loss piezoelectric plates connected together and responsive to the application of a mechanical stress to the stack to produce an electrical output.

13 Claims, 1 Drawing Sheet

POWER GENERATOR EMPLOYING PIEZOELECTRIC MATERIALS

FIELD OF INVENTION

This invention relates to a power generator and, more particularly, to a power generator employing piezoelectric devices.

BACKGROUND OF THE INVENTION

Conventional electromagnetic generators employ a moving coil of electrically conducting material, such as a wire immersed in a magnetic field. The movement of the coil in the magnetic field produces an electric current, as is well known. Energy losses are encountered by the passage of the generated electrical current through the wire conductors of the coil. These energy losses produce heat, which is basically generated at a rate equal to the current squared times its electrical resistance. The heat loss in such generators can be substantial. These losses can be significantly reduced in typical applications by using a generator which utilizes very low loss piezoelectric material which produces an electrical charge when mechanically stressed in a periodic fashion in place of the electromagnetic generator.

The piezoelectric effect is well known. This phenomenon produces an electric field within a suitable material when a mechanical force is applied. Conversely, if an electrical drive signal is applied to a piezoelectric material, a mechanical vibration results. As one can ascertain, such devices have been employed in resonators and other electronic or electromechanical devices. The piezoelectric effect has been widely investigated in the prior art and new materials are continuously being found.

As indicated above, high power generators, which can range from the 10 watt to multi-kilowatt range and utilize electrical wire, are extremely large and carry substantial weight. The use of piezoelectric materials and associated structures will result in a much lighter weight device, since the need for iron-based metallic structure is eliminated. Synthetic piezoelectric ceramics have been employed as transducing materials and have achieved reproducibility for many given compositions. These devices can be operated in various modes and basically can operate to convert stress or strain into an electrical field. Certain important piezoelectric ceramic materials include modified lead zirconate titanate (PZT) compositions and, to a lesser extent, modified barium titanate and lead titanate compositions. The use of, and properties of, piezoelectric ceramics are also well known.

It is, therefore, desirable to produce a high power generator employing low loss piezoelectric material which produces an electrical charge when mechanically stressed. In accordance with an aspect of the present invention, it is further desirable to implement a low/lowest possible output impedance to maximize power transfer to typical high power loads, which may be achieved by maximizing both the effective capacitance of the generating structure as well as the frequency of the prime mover acting on the generating structure.

SUMMARY OF INVENTION

An electrical power generator comprises a piezoelectric device which is capable of providing an electrical output upon application of a mechanical force to the device. The generator further comprises a cam having a cam surface of a given configuration and capable of being rotated about an axis. A surface follower couples the piezoelectric device to the cam surface to cause the device to provide an electrical output when the cam is rotated, where a mechanical force is exerted on the device by the cam surface during rotation of the cam.

DETAILED DESCRIPTION OF THE FIGURES

Figure 1:
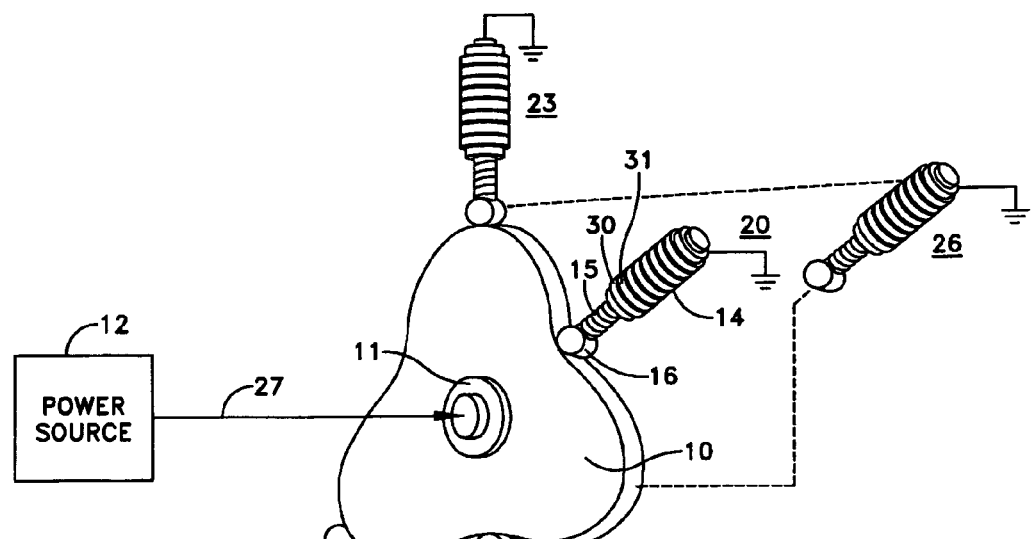
FIG. 1 is a schematic representation of a piezoelectric power generator according to an embodiment of the present invention.

Referring to FIG. 1, there is shown an embodiment of the present invention. As seen in FIG. 1, a group of piezoelectric devices designated as 20, 21, 22 and 23 are disposed in a radial manner about a centrally located cam 10. The cam 10 has a central hub 11, which is coupled directly to a power source 12. The power source, or prime mover 12 is a source of energy and may be, for example, a water wheel, or a windmill, or some other source of power, which applies rotational motion to the cam 10 via an associated shaft as, for example, 27. Techniques for coupling cams to shafts for rotation of the same are well known. Each piezoelectric device 20, 21, 22 and 23 is located about the periphery of the cam 10 and is fixed in position with regard to the cam. Hence, as the cam 10 is rotated, the piezoelectric device experiences different applied forces as a function of the surface configuration of the cam. Each piezoelectric device, such as 20, includes a stack 14 of piezoelectric ceramic material, preferably a stack of ceramic disks or plates. The piezoelectric ceramic material is employed as the active material. Such materials have very low loss properties and result in a highly efficient generator of electric power. Each piezoelectric device has a stack 14 which is coupled to a spring 15 which is coupled to a roller 16. The piezoresistive stack is therefore, subjected to a periodically varying force, as the cam is rotated. As one can see, each of the piezoelectric devices 20, 21, 22 and 23 produces a periodically varying waveform, as the cam 10 is rotated. While FIG. 1 depicts cam 10 as a three-lobed cam, it is understood that other cam configurations can be employed as well. The surface configuration of the cam 10 may approximate that of a sinusoidal waveform whereby, as the cam is rotated, the spring 15 is compressed according to the cam surface, thereby exerting a variable force on the piezoelectric stack 14. The piezoelectric stack 14 will provide a voltage or current proportional to the applied force. This should be apparent to one skilled in the art.

Figure 2:
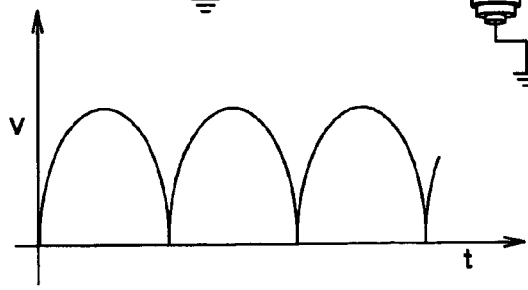
FIG. 2 is a graph depicting a fully rectified signal available from the generator shown in FIG. 1.

The piezoelectric stack 14 is essentially a multi-layer capacitor which, due to its unique properties, has the ability to produce an electrical charge as the result of an externally applied mechanical stress. Electrical current is generated when the stack 14 is electrically connected to an external electric circuit and is mechanically stressed in a periodic fashion. The cam configuration 10 shown in FIG. 1 will enable each of the piezoelectric devices 20 through 23 to provide a waveform, as shown in FIG. 2. As one can ascertain, this waveform approximates a full wave rectified signal.

The waveform of FIG. 2 may approximate a full wave rectified sine wave, or cosine wave, depending on the phase. It can also be seen that, depending on the shape of the cam surface, one can produce other periodic waveforms utilizing the above-described techniques. As can be seen in FIG. 1, a particular feature of the present invention is the use of a piezoelectric stack, such as 14, in each piezoresistive device as 20 through 23. Each stack consists of a large number of very thin ceramic plates bonded together. The piezoelectric stacks 14 are assembled using conventional fabrication techniques, such as tape casting. These techniques are currently utilized in the manufacture of ceramic capacitors. The ceramic piezoelectric devices are well known and essentially, are treated in the same way as capacitors. The piezoelectric plates, such as plate 30 and 31 are well known. These plates can be connected together in parallel or in series, depending upon the application. If they are connected in series, then one would obtain a relatively large voltage due to the addition of voltages by each plate in a series arrangement. If connected in parallel, each plate can be considered as a current source. The outputs of the piezoelectric devices, 20 to 23, can further be processed by additional circuitry (not shown) to produce a combined output or can be individually used. The waveform shown in FIG. 2, which is the full wave rectified signal, can be converted into a DC signal by many well known circuit techniques.

Also seen in FIG. 1 (dashed lines) is that the cam 10 can be thickened, and therefore a plurality of additional piezoelectric devices such as 26, for example, can be positioned on the extended surface. One can then have a large plurality of such piezoelectric devices capable of generating additional power. It is known that, while the tape casting is used in manufacture of ceramic capacitors, it can also be used with piezoelectric ceramic discs, and one can employ other fabrication techniques. These techniques should be capable of high volume, low cost production.

The approach depicted in FIG. 1 results in a low voltage, high current capability, in contrast to earlier piezoelectric power generation devices that are generally high voltage, low current and very low power devices. One can see that typical electrical loads require high current capabilities at low to moderate voltages, and therefore, the field is dominated by the electromagnetic base power generators. The multi-lobed cam spring combination, as shown and depicted in FIG. 1, is designed to maximize the frequency of the periodically varying force on the piezoelectric stacks for effective generator operation. The effectiveness of the piezoelectric power source increases as a direct function of the frequency of the applied force due to the capacitive nature of the stack. As the frequency is increased, the output current capability and thus, the power output, is also increased. The spring, shown as 15, basically is a compression spring and is utilized mainly as an interface between the mechanically stiff piezoelectric stack 14 and the likewise stiff cam or cam surface 10. The compliance of the spring is chosen to provide the required force capability consistent with the cam geometry and speed of rotation.

Figure 3:
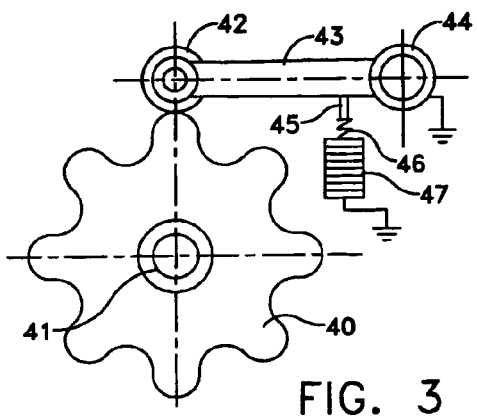
FIG. 3 is a simple diagram of a multi-lobe cam and cam follower useful according to an aspect of the present invention.

Another feature of the structure shown in FIG. 1 is the implementation of a specific number and distribution of piezoelectric generators. As one can ascertain, each piezoelectric device, such as 20, 21, 22 and 23, is a piezoelectric generator. This arrangement is specific to the number of lobes on the actuating cam, with the purpose of elimination of any net back torque, due to the reactive deflection of the interface springs. The only back torque encountered by the cam is due to that required for the generation of power. While only three lobes are shown, larger diameter cams with many more lobes and therefore, many more stack assemblies can be implemented to greatly increase total power output capability. Thus, as shown in FIG. 3, there is shown an eight lobe cam 40, which again, has a central hub 41 which is coupled to a power source. A follower, including a roller 42, is coupled to an arm 43 and to a fixed pivot point 44. A push rod 45 actuates a spring 46 which is coupled to the piezoelectric stack 47 to enable the stack 47 to provide an output voltage, according to the movement of the cam follower on the cam surface. While only one follower is depicted, a plurality of such devices can be employed. It is understood that the main concept of this invention is to use a stack of piezoelectric plates and to couple the stack to the surface of a rotating cam. The coupling includes a spring with a cam surface follower. The follower traverses the surface of the cam to exert a periodically varying force on the stack according to the cam surface configuration. Thus, it is understood that many alternate cam follower devices can be employed in a similar manner as that shown in FIGS. 1 and 3.

Figure 4:
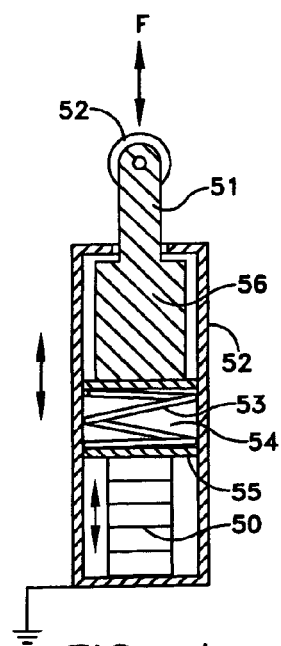
FIG. 4 is an alternate embodiment of a spring arrangement and piezoelectric stack assembly which can be utilized with the present invention.

Shown in FIG. 4 is another configuration, whereby a piezoelectric stack 50 is coupled to a cam follower arm 51 via a spring 53. The cam follower has a top roller 52 rotatably mounted on the arm 51. The arm 51 extends into a housing as a piston housing 52. Therefore, rod 51 is connected to or integrally formed with a piston like member 56. The stack 50 is positioned within the housing 52, having a moveable platform 53, which is coupled to a spring 54 having a top moveable plate 55 coupled to the end of the spring. The spring 54, between moveable plates 53 and 55, exerts a force on the stack 50. One can also employ a piston, which is coupled directly to the stack without a spring. The piston may be elastomeric to exert a force on the stack 50 without damaging the same. Thus, as seen, as a force F is applied to the surface of the roller, the spring causes a force to be exerted on the stack 50 via the moveable platforms 53 and 55. The stack 50 produces a voltage output proportional to the surface configuration of the cam. Thus, as one can ascertain, while many different cam surfaces are contemplated, there are also many different mechanical couplers available for the piezoelectric device to interface with the cam surface. A coupler basically includes the cam surface follower as roller 16, which is coupled to a spring, such as spring 15 of FIG. 1. The spring 15 is coupled to a stack 14 of piezoelectric disks or plates. As the cam is rotated, a time varying force is applied to the piezoelectric stack to cause the piezoelectric stack to produce a periodic output signal. This signal can be employed to produce high current capabilities at low or moderate voltages. The output depends on the number of ceramic discs in each stack and depends upon the manner on the which the discs are wired. It is also understood that the outputs from each of the piezoelectric devices, such as 20 through 23, (FIG. 1) can be combined by various techniques known in the art to produce high power waveforms utilized for power generation.

While FIG. 1 generally shows a typical power source 12, it is, of course, understood that the approach is very useful for typically encountered lower rotational speeds, as those of water and wind driven sources. Thus, as one can see, typical mechanical energy is derived from, for example, water wheels, waterfalls, windmills and so on. These devices can be utilized as a power source to drive a multi-lobe cam, such as cam 10 (FIG. 1) which is coupled to piezoelectric devices, to produce electrical power. Essentially, one can see that the structure and format described in FIG. 1 functions as a converter of mechanical or rotary energy into usable electrical power which can be multi-phased alternating current or voltage. The waveforms can be rectified to produce a DC output.

The use of piezoelectric materials results in a high power generator design, which generators are a lightweight and efficient as having low losses. Such generators are cost effective and easy to produce. The elimination of the electromagnetic approach eliminates the need for heavy metal materials and therefore, the piezoelectric generators are of reduced weight and further allow the use of non-magnetic, low cost materials. While, there is described an electric generator, the invention can also be employed to charge batteries and for other power uses as well.

It should be apparent to one skilled in the art that there are many variations of the present invention, as, for example, described above. The cam configurations can have different lobed surfaces, as well as the fact that the coupling of the piezoelectric stacks to cam surface following devices can vary in many respects. All of these alternate arrangements are deemed to be encompassed within the spirit and scope of the claims herein.

What is claimed is:

1. An electrical power generator comprising:
   a piezoelectric device capable of providing an electrical output upon application of a mechanical force to said device;
   a cam having a cam surface of a given configuration, said cam capable of being rotated about an axis; and
   surface follower means coupling said piezoelectric device to said cam surface to cause said device to provide an electrical output when said cam is rotated where a mechanical force is exerted on said device by said cam surface during rotation of said cam, said means including a spring member coupled between said cam surface and said device and operative to exert a varying force on said device during cam rotation.

2. The electrical power generator according to claim 1 wherein said piezoelectric device is a stack of plates of piezoelectric material.

3. The electrical power generator according to claim 1 wherein said cam surface is shaped to apply a periodically varying force to said device.

4. The electrical power generator according to claim 3 wherein said cam surface is of a repetitive sinusoidal configuration.

5. The electrical power generator according to claim 1 wherein said cam surface is a multiple lobe surface capable of providing a periodically varying force to said device.

6. The electrical power generator according to claim 1 wherein said means coupling said piezoelectric device to said cam surface further includes a cam follower having a roller coupled to said cam surface and a rod coupled to said piezoelectric device.

7. The electrical power generator according to claim 1 further comprising:
   a plurality of a piezoelectric devices coupled to said cam surface via associated means for coupling each one of said plurality of piezoelectric devices to said cam surface, each located at a different position on said surface to minimize back torque due to the reactive load of said means for coupling.

8. The electrical power generator according to claim 1 further comprising:
   a rotatable shaft coupled to said cam at one end and operative to receive a source of power at said other end.

9. The electrical power generator according to claim 8 wherein said source of power is selected from the group including windmills and water wheels.

10. The electrical power generator according to claim 7 wherein the associated means coupling each one of said plurality of piezoelectric devices to said cam surface comprises a corresponding spring member operative to exert a varying force on the associated device during cam rotation.

11. The electrical power generator according to claim 1 wherein the piezoelectric device comprises a stack of piezoelectric material.

12. The electrical power generator according to claim 1 wherein said spring member comprises a compression spring.

13. The electrical power generator according to claim 1 wherein said spring member comprises a piston.

* * * * *